US010543776B2

(12) United States Patent
Matsushima

(10) Patent No.: US 10,543,776 B2
(45) Date of Patent: Jan. 28, 2020

(54) GO-KART

(71) Applicant: MARI MOBILITY DEV INC., Tokyo (JP)

(72) Inventor: Ryutaro Matsushima, Tokyo (JP)

(73) Assignee: Mari Mobility Dev Inc., Tokyo (JP)

( * ) Notice: Subject to any disclaimer, the term of this patent is extended or adjusted under 35 U.S.C. 154(b) by 0 days.

(21) Appl. No.: 16/078,996

(22) PCT Filed: Feb. 21, 2017

(86) PCT No.: PCT/JP2017/006426
§ 371 (c)(1),
(2) Date: Aug. 22, 2018

(87) PCT Pub. No.: WO2017/146064
PCT Pub. Date: Aug. 31, 2017

(65) Prior Publication Data
US 2019/0100131 A1    Apr. 4, 2019

(30) Foreign Application Priority Data

Feb. 22, 2016    (JP) .................................. 2016-030719

(51) Int. Cl.
*B60Q 1/28*    (2006.01)
*B60Q 1/26*    (2006.01)
(Continued)

(52) U.S. Cl.
CPC ......... *B60Q 1/2696* (2013.01); *B60Q 1/2615* (2013.01); *F21S 43/00* (2018.01);
(Continued)

(58) Field of Classification Search
CPC .......... B60Q 1/26; B60Q 1/2615; B60Q 1/32; F21S 43/14; F21S 43/00
See application file for complete search history.

(56) References Cited

U.S. PATENT DOCUMENTS

| 6,037,865 | A | 3/2000 | Heinz et al. |
| 9,366,404 | B1 * | 6/2016 | Porter ................... A63C 13/00 |

(Continued)

FOREIGN PATENT DOCUMENTS

| DE | 102012003200(A1) | 8/2013 |
| JP | H09-094353 | 4/1997 |

(Continued)

OTHER PUBLICATIONS

Office Action dated Sep. 24, 2019 in JP Application No. 2016-030719.

(Continued)

*Primary Examiner* — Anabel Ton
(74) *Attorney, Agent, or Firm* — Muncy, Geissler, Olds & Lowe, P.C.

(57) ABSTRACT

The purpose of the present invention is to provide a go-kart which is equipped with an LED light fixture that can efficiently shine light below the vehicle. This go-kart is equipped with: a vehicle body frame that supports an engine, front wheels, and rear wheels, and is exposed to the exterior; and elongated strips of LED tape that are affixed to both the left and right sides of the vehicle body frame extending in the front-rear direction, and shine light below the vehicle body frame. In addition, the front wheels and rear wheels are supported on the outer side of the vehicle body frame. When the front-side end of the vehicle is viewed from the left-right direction, the LED tape and the LED tape extend to positions which overlap with the front wheels, and when the rear-side end of the vehicle is viewed from the left-right direction, the LED tape and the LED tape extend to positions which overlap with the rear wheels.

4 Claims, 8 Drawing Sheets

(51) Int. Cl.
  *F21S 43/00* (2018.01)
  *F21S 43/14* (2018.01)
  *B62D 21/02* (2006.01)
  *B60Q 1/30* (2006.01)
  *B60Q 1/32* (2006.01)

(52) U.S. Cl.
  CPC ............ *F21S 43/14* (2018.01); *B60Q 1/28* (2013.01); *B60Q 1/30* (2013.01); *B60Q 1/32* (2013.01); *B62D 21/02* (2013.01)

(56) References Cited

U.S. PATENT DOCUMENTS

| | | |
|---|---|---|
| 2004/0217855 A1 | 11/2004 | Wang |
| 2005/0036327 A1 | 2/2005 | Patel |
| 2012/0155097 A1 | 6/2012 | Gross |
| 2014/0232147 A1* | 8/2014 | Held .............. B60J 7/0015 296/210 |
| 2016/0067597 A1* | 3/2016 | Hamilton .............. A63F 9/14 463/6 |
| 2016/0121786 A1* | 5/2016 | Gasper .............. B60Q 1/445 362/464 |

FOREIGN PATENT DOCUMENTS

| | | |
|---|---|---|
| JP | H11-301349 A | 11/1999 |
| JP | 3097670 | 2/2004 |
| JP | 2005008149 A | 1/2005 |
| JP | 2015-054622 A | 3/2015 |
| JP | 2015-160595 A | 9/2015 |

OTHER PUBLICATIONS

Dez Jones PVR: "Go kart lights", Youtube, May 13, 2012, XP054979776, Retrieved from the Internet: URL:https://www.youtube.com/watch?v=dGZToK MIyiO [dated Oct. 10, 2019]; p. 1.
PimpMyXbox: "1997 Thunder Kart. Go Kart with gx200 clone and underglow.", Youtube, Apr. 13, 2011, XP054979781, Retrieved from the Internet: URL:https://www.youtube.com/watch?v=xS-wCu Jpzus [dated Oct. 10, 2019]; p. 1.
1 Brando Reviews: "Manco Go-Kart LED Lightning setup Underlights 18W Cree ↑ Amazon", Youtube, Jun. 18, 2015 XP054979779, Retrieved from the Internet: URL:https://www.youtube.com/watch?v=ctyqoH Ziag8 [dated Oct. 10, 2019]; p. 1.
Extended European Search Report issued in the EP Patent Application No. EP17756502.5, dated Oct. 28, 2019; pp:1-11.

* cited by examiner

GO-KART

TECHNICAL FIELD

The present invention relates to a go-kart including a vehicle body frame that supports a driving source and wheels and is exposed to an exterior.

BACKGROUND ART

Conventionally, an example of attaching a lighting device such as a light-emitting diode (LED) tape to an exterior of a four-wheeled automobile, etc. has been known. For example, Patent Document 1 shows an example using an LED tape as an example of a light source of a turn signal indicator and an auxiliary indicator.

Patent Document 1: Japanese Unexamined Patent Application, Publication No. 2015-160595

DISCLOSURE OF THE INVENTION

Problems to be Solved by the Invention

Incidentally, there is a case of desiring to shine light below a vehicle during driving from a viewpoint of calling attention or design. Even when the lighting device is attached to the exterior of the four-wheeled automobile as in the past, it is impossible to sufficiently shine light below the vehicle. In a conventional lighting technology applied to a running vehicle, it is impossible to efficiently shine light below the running vehicle.

An object of the invention is to provide a go-kart including an LED light fixture capable of efficiently shining light below a vehicle.

Means for Solving the Problems

The invention relates to a go-kart including a vehicle body frame that supports a driving source and wheels and is exposed to an exterior, in which the go-kart includes an elongated LED light fixture directly affixed to both left and right sides of the vehicle body frame extending in a front-rear direction to shine light below the vehicle body frame.

It is preferable that the wheel is supported on an outer side of the vehicle body frame, and the LED light fixture extends in the front-rear direction along the vehicle body frame up to a position overlapping the wheel when at least one end is viewed in a left-right direction.

The go-kart further includes a bumper provided in front of the vehicle body frame, a front cowl positioned between the vehicle body frame and the bumper, and a front-side LED light fixture that is affixed to a lower surface of the front cowl and extends in the left-right direction, in which the front-side LED light fixture is configured such that a light source thereof faces forward.

Effects of the Invention

According to the invention, it is possible to provide a go-kart including an LED light fixture capable of efficiently shining light below a vehicle.

PREFERRED MODE FOR CARRYING OUT THE INVENTION

Figure 1:
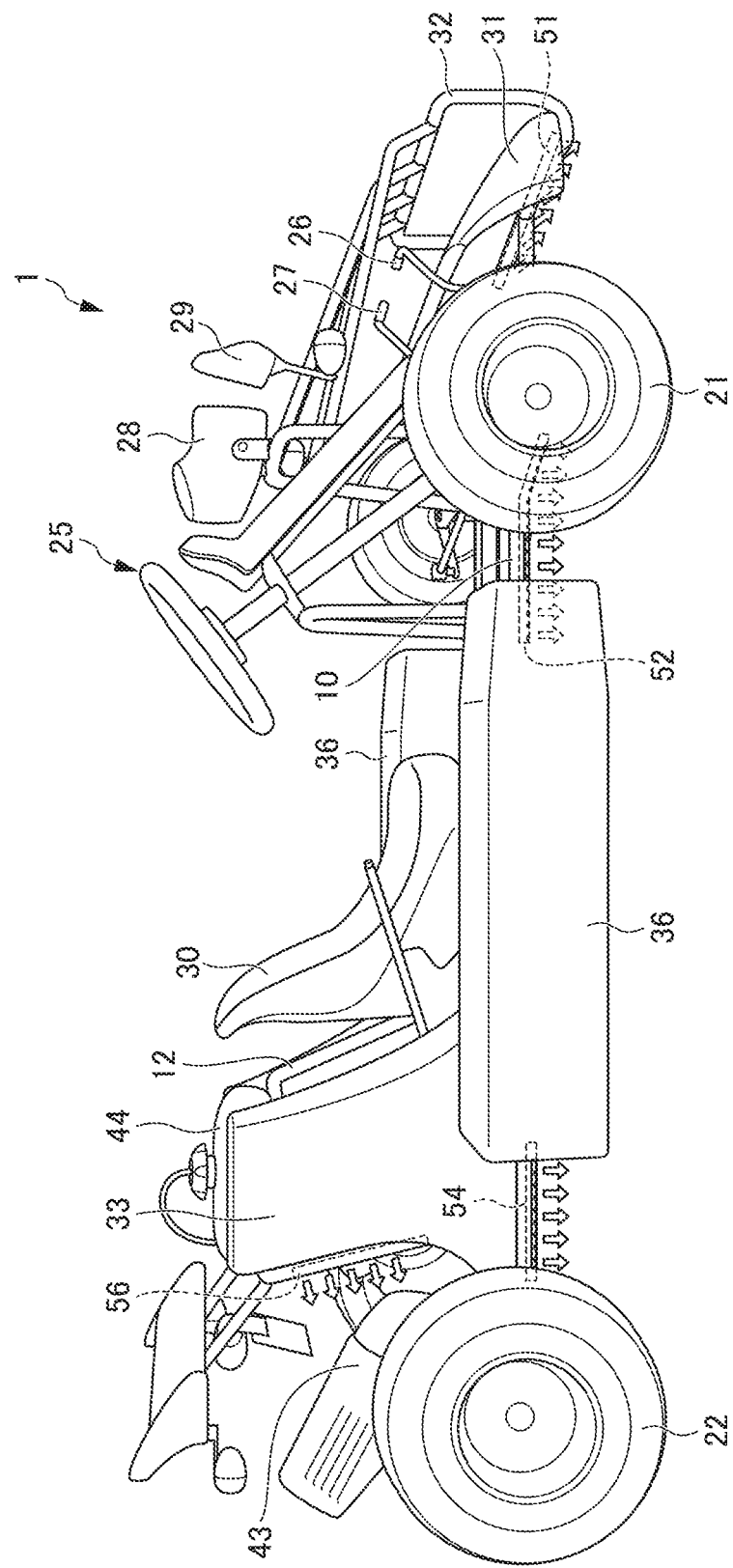
FIG. 1 is a side view of a go-kart according to an embodiment of the invention.
Figure 2:
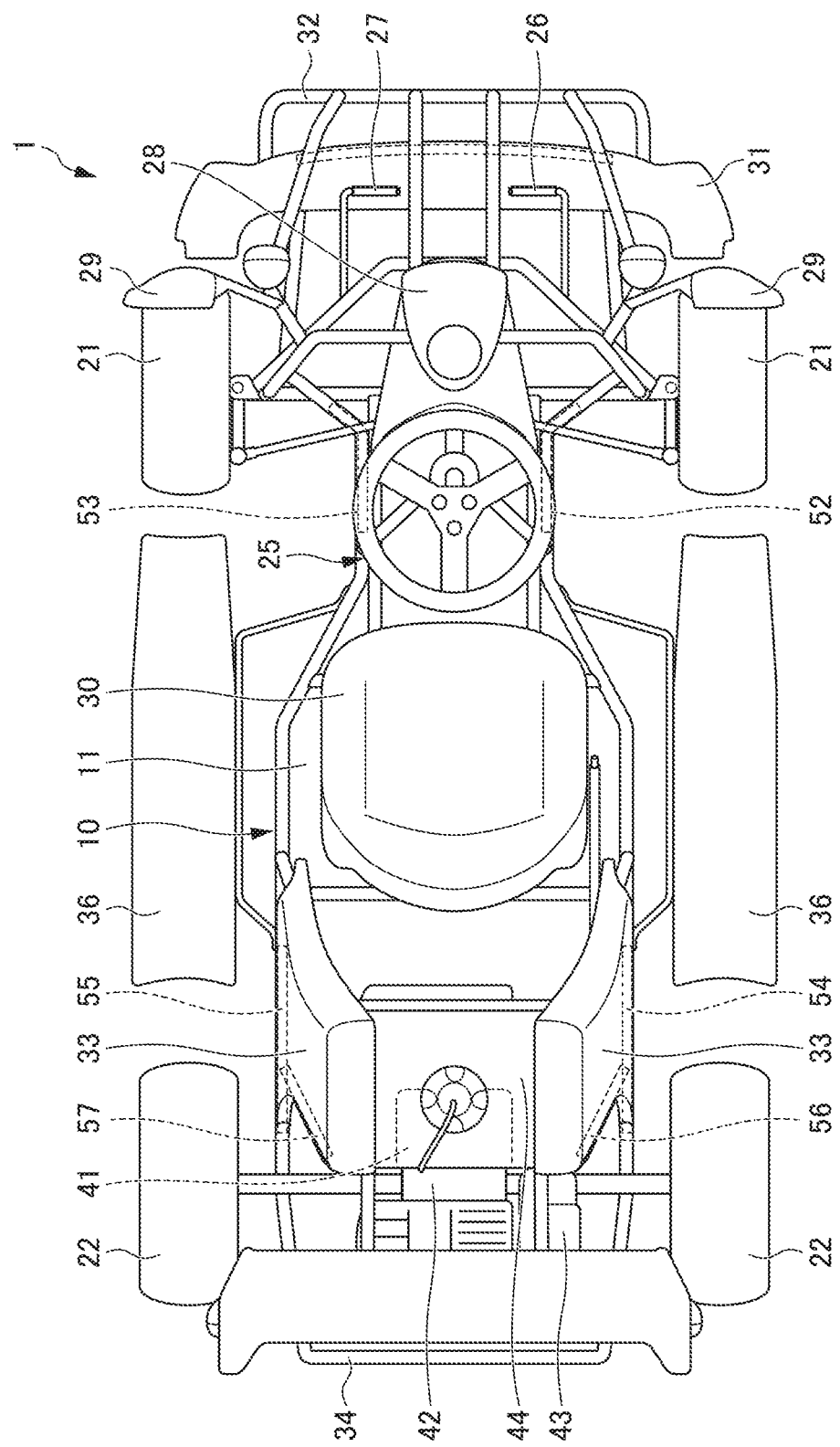
FIG. 2 is a plan view of the go-kart schematically illustrating positions of LED tapes.

Hereinafter, a preferred embodiment of the invention will be described with reference to drawings. FIG. 1 is a side view of a go-kart 1 according to an embodiment of the invention. FIG. 2 is a plan view of the go-kart 1 schematically illustrating positions of LED tapes 51 to 57. In description below, front-rear, left-right, and vertical directions correspond to directions viewed from an occupant (driver) riding in the go-kart 1 unless otherwise stated.

As illustrated in FIG. 1, the go-kart 1 is a four-wheeled automobile in which various parts such as an engine 41, etc. are supported on a vehicle body frame 10.

The vehicle body frame 10 is formed in a frame shape by a pipe frame. As illustrated in FIG. 2, a floor panel 11 is affixed to a center of the vehicle body frame 10, and a seat 30 on which the occupant is seated is affixed above the floor panel 11.

An operation system of a steering device 25, an accelerator pedal 26, a brake pedal 27, etc. connected to a steering mechanism of a front wheel 21 is disposed in front of the seat 30 in the vehicle body frame 10. In addition, a front light 28, a rearview mirror 29, etc. are affixed to the vehicle body frame 10 on a front side of the steering device 25. In addition, a front cowl 31 and a front bumper 32 are affixed to a front portion of the vehicle body frame 10.

A mount frame 12 for affixing various parts is disposed behind the seat 30 in the vehicle body frame 10. The mount frame 12 is formed in a lattice shape by a pipe frame, and an outer shape thereof is a quadrangular pyramid shape inclined backward.

Side covers 33 are affixed to both left and right sides of the mount frame 12. A fuel tank 44 is affixed to an upper part of the mount frame 12. A part of an electrical system of a regulator/rectifier, a battery, etc. is affixed below the fuel tank 44.

In addition, a driving system of the engine 41 as a driving source, a transmission 42, etc. and an exhaust system of a chamber 43, etc. are supported behind an inside of the mount frame 12 in the vehicle body frame 10. For example, a two-stroke type of 50 cc is used as the engine 41.

A drive shaft 45 supporting a rear wheel 22 is connected to the transmission 42, and a driving force of the engine 41 is changed in speed by the transmission 42 and transmitted to the drive shaft 45. For example, a continuously variable transmission having a differential gear and a reverse gear is used as the transmission 42.

A rear bumper 34 is disposed at a rear portion of the vehicle body frame 10. In addition, side boxes 36 are affixed to both left and right sides of the vehicle body frame 10, respectively.

Next, a description will be given of the LED tapes 51 to 57 as light sources disposed at a plurality of places of the go-kart 1. As illustrated in FIG. 2, the LED tapes 51 to 57 are provided at a plurality of places of the vehicle body frame 10 and the mount frame 12 of the go-kart 1, and are directly affixed to the frame by a binding band (not illustrated) or an appropriate method such as adhesion.

Figure 3:
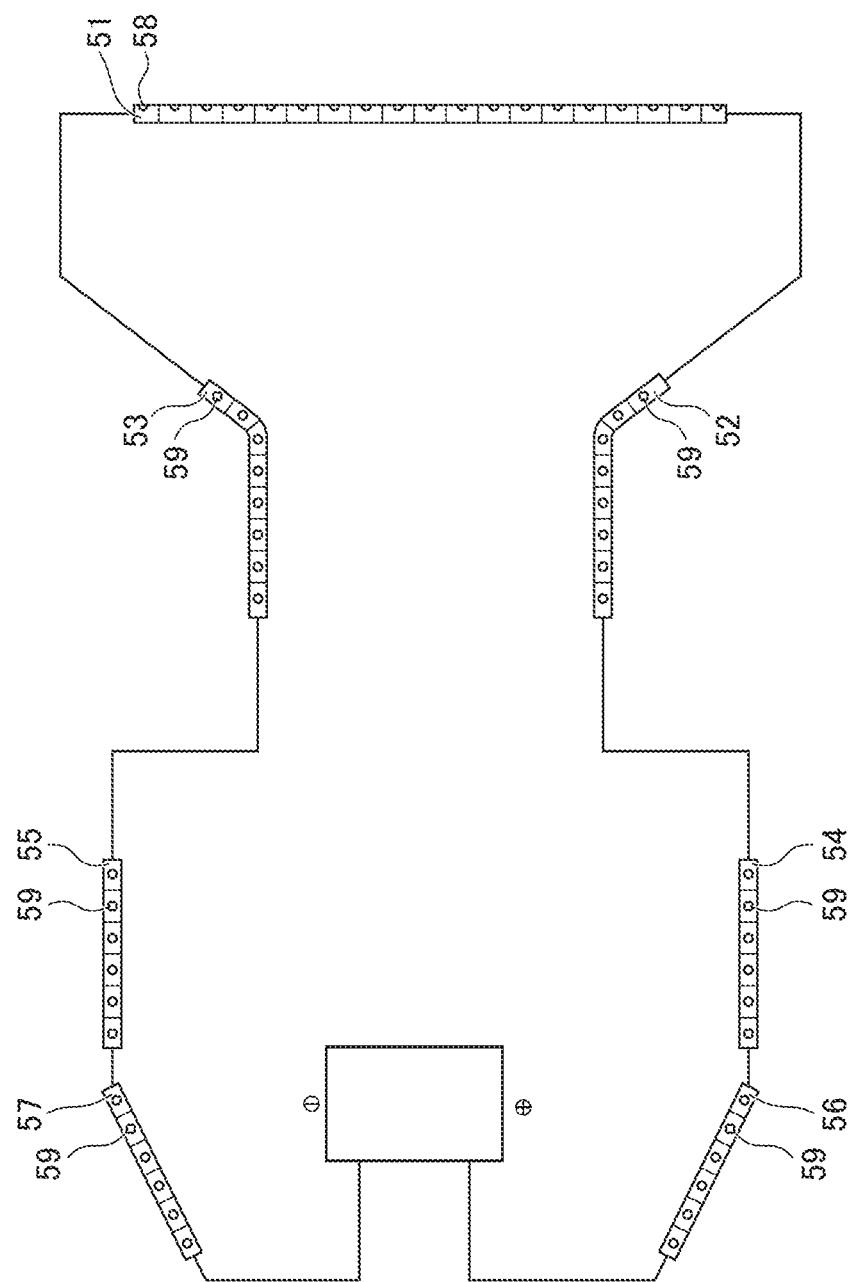
FIG. 3 is a wiring diagram schematically illustrating an electrical connection relation of the LED tapes.

FIG. 3 is a wiring diagram schematically illustrating an electrical connection relation of the LED tapes 51 to 57. The LED tapes 51 to 57 are formed by arranging a plurality of LED elements on an elongated strip-like flexible member.

For example, green or blue light is used as lights irradiated by the LED tapes 51 to 57. In the present embodiment, the lights are unified into green light having high luminance. In addition, a side emission type is used for the LED tape 51, and a front emission type is used for the LED tapes 52 to 57.

As illustrated in FIG. 3, the LED tapes 51 to 57 are connected in series through a cable. Power generated by a generator is supplied to the LED tapes 51 to 57 through the regulator/rectifier. A battery may be used to supply power to the LED tapes 51 to 57.

Figure 4:
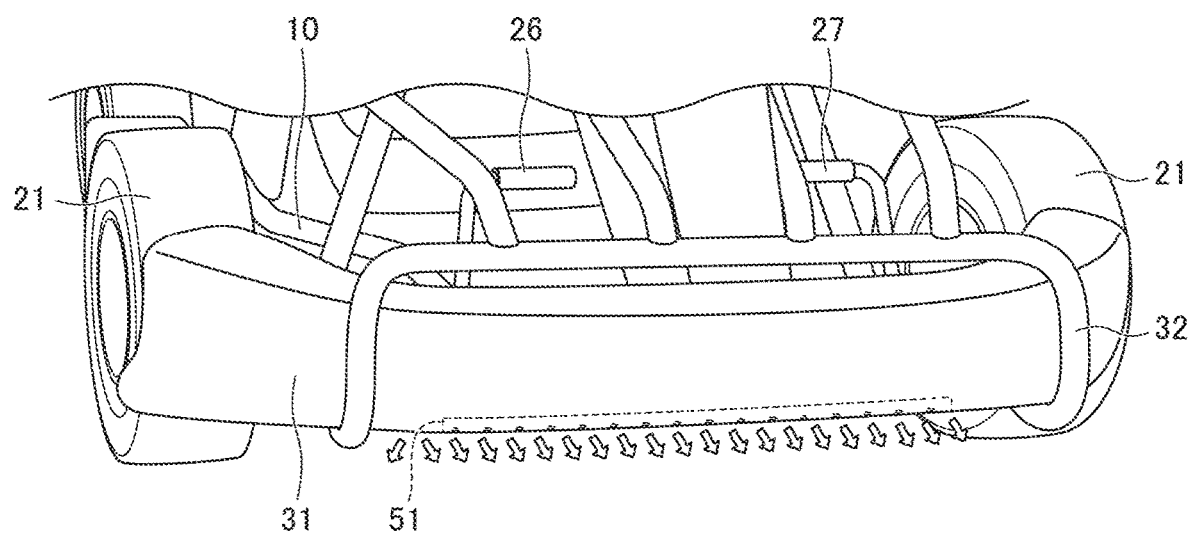
FIG. 4 is a perspective view illustrating the LED tape disposed at a front portion of a vehicle body frame.

Arrangement positions of the respective LED tapes 51 to 57 will be described. FIG. 4 is a perspective view illustrating the LED tape 51 disposed at the front portion of the vehicle body frame 10. FIG. 5 is a schematic diagram illustrating an example of types and arrangement positions of the LED tapes 51 to 57.

As illustrated in FIG. 4, the LED tape 51 is affixed to a lower surface of the front cowl 31 supported at a front of the vehicle body frame 10 extending in the left-right direction. The LED tape 51 is attached to cover a predetermined range along a longitudinal direction (left-right direction) of the front cowl 31.

Figure 5A:
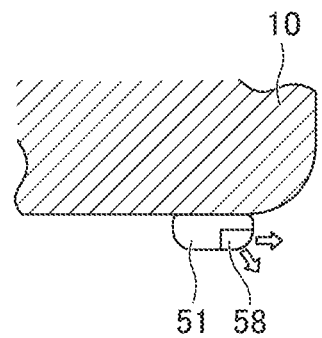
FIG. 5A is a schematic diagram illustrating an example of types and arrangement positions of the LED tapes.

As illustrated in an example of FIG. 5A, the LED tape 51 corresponds to the side emission type, and corresponds to a type in which a light source 58 is disposed in a direction orthogonal to an attachment surface (contact surface with respect to the vehicle body frame 10) thereof. The LED tape 51 is affixed so that the light source 58 faces forward, and light irradiated from the LED tape 51 diffuses forward and downward and shines in front of and below the front cowl 31. In the light irradiated from the LED tape 51, light irradiated on the front cowl 31 is reflected toward a road surface side, and thus it is possible to efficiently shine light around the front cowl 31.

Figure 6:
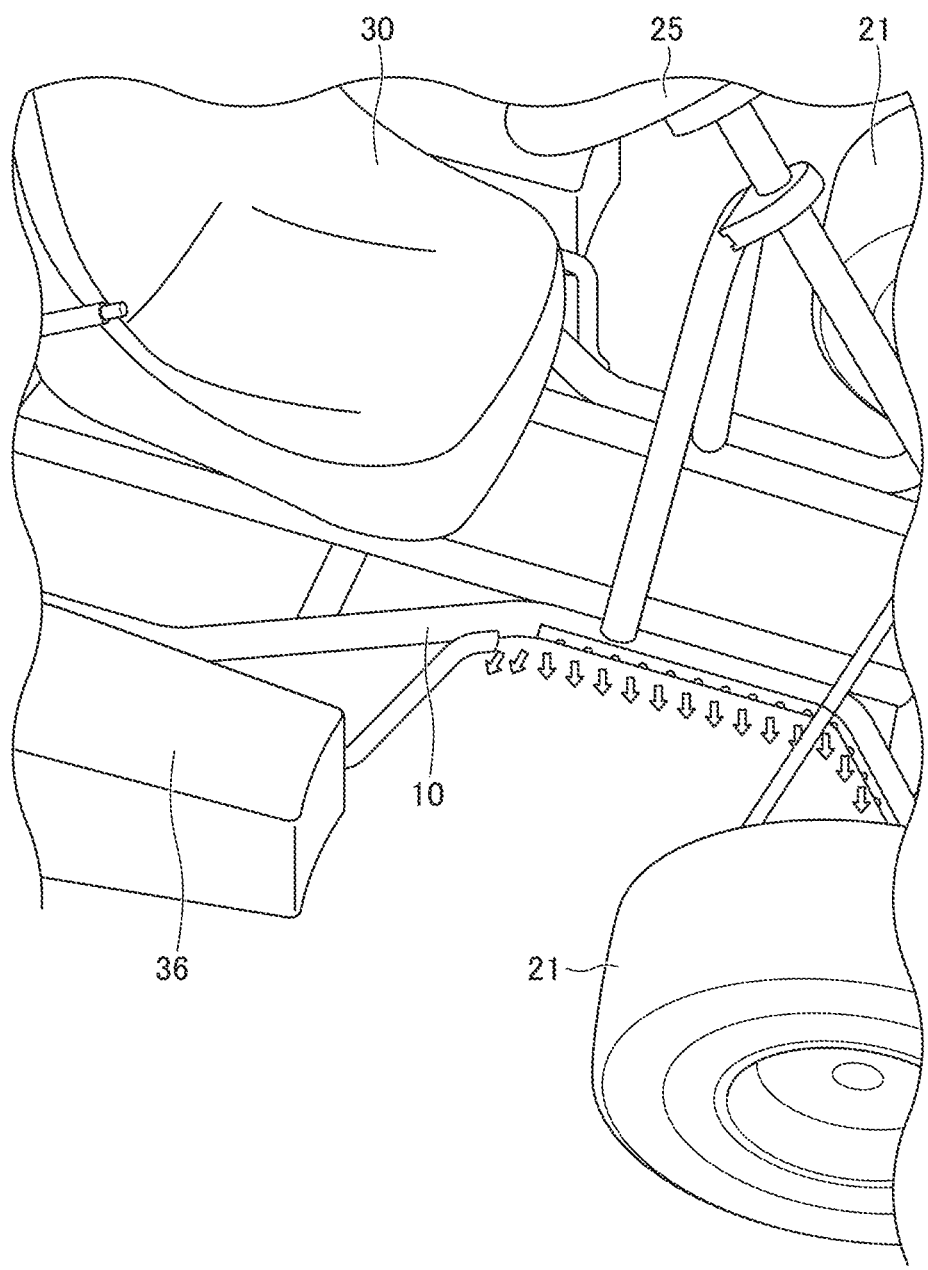
FIG. 6 is a perspective view illustrating the LED tape disposed around a front wheel in the vehicle body frame.

FIG. 6 is a perspective view illustrating the LED tape 52 disposed around the front wheel 21 in the vehicle body frame 10. As illustrated in FIG. 6, the LED tape 52 is affixed to the vehicle body frame 10 which is curved around the front wheel 21. The LED tape 52 is affixed in a range from a front side of the side box 36 to an inner side of the front wheel 21 to follow a curvature of the vehicle body frame 10.

Figure 5B:
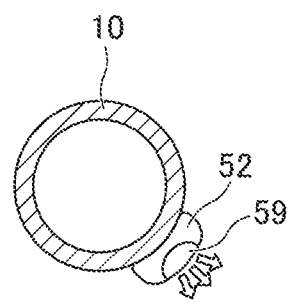
FIG. 5B is a schematic diagram illustrating an example of types and arrangement positions of the LED tapes.

As illustrated in an example of FIG. 5B, the LED tape 52 corresponds to the front emission type, and corresponds to a type in which a light source 59 is disposed on an opposite side from an attachment surface (contact surface with respect to the vehicle body frame 10) thereof. The LED tape 52 is affixed in a deflected state according to a shape of the cylindrical vehicle body frame 10 so that the light source thereof faces obliquely downward and outward.

As illustrated in FIG. 2, similarly to the LED tape 52, the LED tape 53 is affixed around the front wheel 21 on the left side in the vehicle body frame 10. That is, the road surface around the left and right front wheels 21 of the vehicle body frame 10 is illuminated over a wide range by the LED tape 52 and the LED tape 53, respectively. Further, the light irradiated from the LED tape 52 and the LED tape 53 illuminates inner side surfaces of the front wheels 21 in the left-right direction, so that it is possible to achieve such a visual effect that the front wheels 21 lift up in the dark during night driving, etc.

Figure 7:
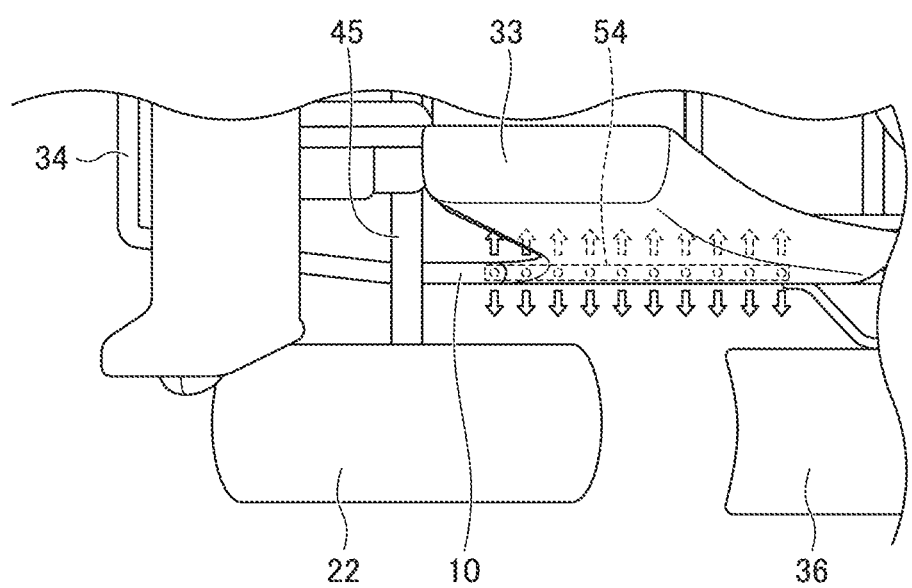
FIG. 7 is an enlarged plan view illustrating the LED tape disposed around a rear wheel.

FIG. 7 is an enlarged plan view illustrating the LED tape 54 disposed around the rear wheel 22. As illustrated in FIG. 7, the LED tape 54 is affixed to the vehicle body frame 10 extending in the front-rear direction around the rear wheel 22 so as to reach the inside of the rear wheel 22.

Figure 5C:
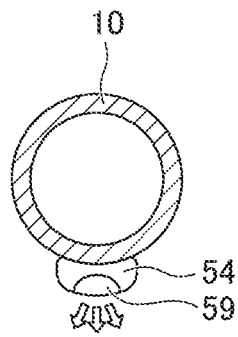
FIG. 5C is a schematic diagram illustrating an example of types and arrangement positions of the LED tapes.

As illustrated in an example of FIG. 5C, the LED tape 54 corresponds to the front emission type, and is affixed on a flat lower surface of the vehicle body frame 10 so that a light source faces vertically downward.

As illustrated in FIG. 2, similarly to the LED tape 54, the LED tape 55 is affixed around the rear wheel 22 on the left side in the vehicle body frame 10. That is, the road surface around the left and right rear wheels 22 of the vehicle body frame 10 is illuminated over a wide range by the LED tape 54 and the LED tape 55, respectively. Further, the light irradiated from the LED tape 54 and the LED tape 55 illuminates inner side surfaces of the rear wheels 22 in the left-right direction, so that it is possible to achieve such a visual effect that the rear wheels 22 lift up in the dark during night driving, etc.

Figure 8:
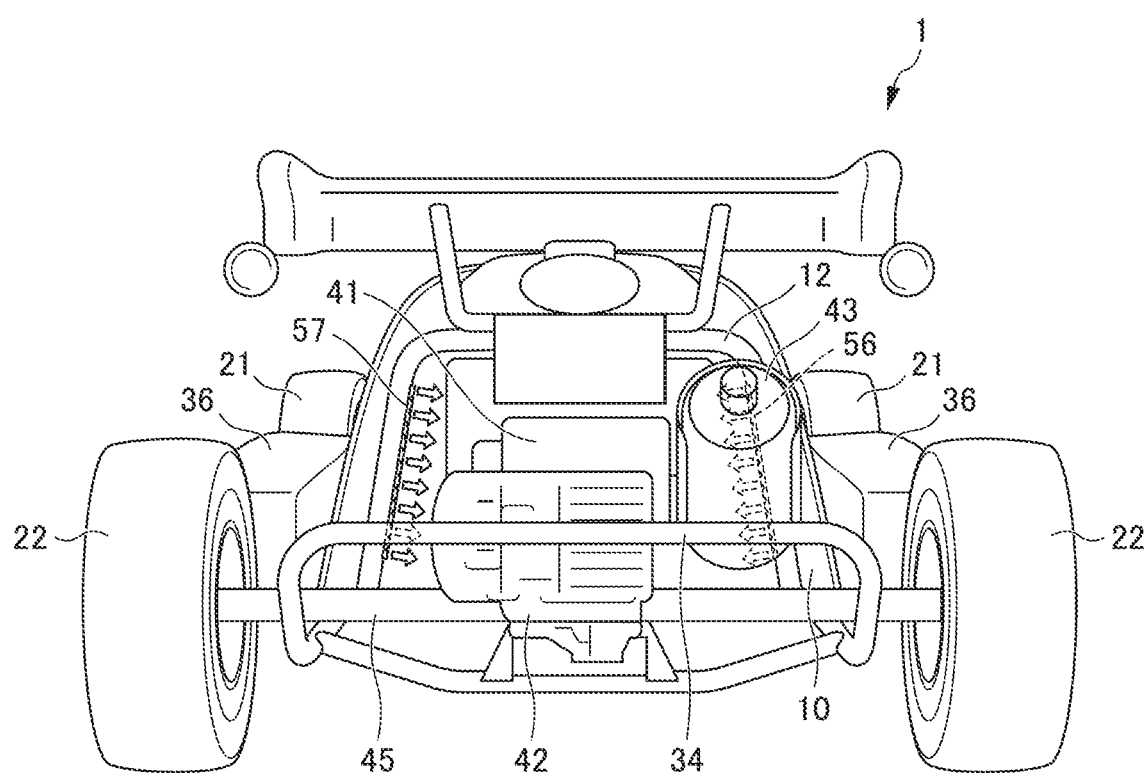
FIG. 8 is a rear view of the go-kart illustrating the LED tape and the LED tape disposed on a mount frame.

FIG. 8 is a rear view of the go-kart 1 illustrating the LED tape 56 and the LED tape 57 disposed on the mount frame 12. As illustrated in FIG. 8, the LED tape 56 and the LED tape 57 are affixed so as to approach each other as going upward according to a shape of the mount frame 12.

The LED tape 56 and the LED tape 57 correspond to a type in which a light source is disposed on an opposite side from an attachment surface thereof (so-called front emission type). In the present embodiment, a part of the engine 41, the transmission 42, the chamber 43, etc. are positioned behind the mount frame 12.

The light irradiated from the LED tape 56 and the LED tape 57 illuminates diagonally rearward while illuminating various parts such as a part of the engine 41, the transmission 42, the chamber 43, etc.

In the go-kart 1 of the present embodiment, since the vehicle body frame 10 and the mount frame 12 which are exposed to the exterior are formed in a frame shape, it is possible to efficiently shine light below the go-kart 1 using a gap between respective frames by causing the LED tapes 51 to 57 to emit light. During running, it possible to call attention to another vehicle by light of the LED tapes 51 to 57 in the go-kart 1, which is a relatively small four-wheeled automobile. In addition, feet become bright even in the dark, and it is possible to give an impression that the go-kart 1 lifts up and runs.

According to the above-described embodiment, the following effects are obtained. That is, the go-kart 1 of the present embodiment includes the vehicle body frame 1 that supports the engine 41, the front wheel 21, and the rear wheel 22 and is exposed to the exterior, and the elongated LED tapes 52 to 55 directly affixed to the both left and right sides of the vehicle body frame 10 extending in the front-rear direction to shine light below the vehicle body frame 10.

In this way, it is possible to efficiently and widely shine light below the vehicle body frame 10 using the elongated LED tapes 52 to 55 attached to the vehicle body frame 10 exposed to the exterior. Since the LED tapes 52 to 55 are configured in an elongated shape, it is possible to realize a configuration of shining light below the vehicle body frame 10 in a simple configuration without interfering with other members attached to the vehicle body frame 10.

In the present embodiment, since the LED tapes 52 to 55 as LED light fixtures are made of a flexible material, it is possible to flexibly cope with the shape of the vehicle body frame 10.

In addition, in the present embodiment, both the front wheels 21 and the rear wheels 22 are supported on the outer side of the vehicle body frame 10, and the LED tape 52 and the LED tape 53 extend to a position overlapping the front wheels 21 when a front-side end is viewed in the left-right direction. In addition, the LED tape 54 and the LED tape 55 extend to positions overlapping with the rear wheels 22 when a rear-side end is viewed from the left-right direction.

In this way, it is possible to efficiently shine light around the front wheels 21 and the rear wheels 22 in the vehicle body frame 10, and it is possible to illuminate a suspension of the go-kart 1 over a wide range. When the light illuminated on the inner side surfaces of the front wheels 21 and the rear wheels 22 are reflected, it is possible to achieve such a visual effect that the go-kart 1 lift up in the dark. In this way, it is easier for the go-kart 1 to be identified from another running vehicle, so that safer driving can be realized.

The go-kart 1 further includes the front bumper 32 provided in front of the vehicle body frame 10, the front cowl 31 positioned between the vehicle body frame 10 and the front bumper 32, and the LED tape 51 which is affixed to the lower surface of the front cowl 31 and extends in the left-right direction, and the LED tape 51 is configured so that the direction of the light source faces forward.

In this way, irradiation light of the LED tape 51 is reflected by the front cowl 31, whereby the front of the go-kart 1 can be illuminated even more. In addition, Since the front emission type LED tape 51 having directivity in the front is used, it is possible to shine light below the front bumper 32 over a wide range. In addition, an influence of vibration can be suppressed when compared to a case in which the LED tape 51 is attached to the front bumper 32, and a situation in which the LED tape 51 is detached from the vehicle body frame 10 can be effectively prevented.

Even though the preferred embodiment of the invention has been described above, the invention is not limited to the above-described embodiment and can be appropriately modified.

For example, the arrangement positions of the respective LED tapes 51 to 57 with respect to the vehicle body frame 10 and the mount frame 12 are not limited to configurations of the above embodiment. For example, the arrangement positions of FIGS. 5A to 5C may be interchanged, and an arrangement method other than those of FIGS. 5A to 5C may be adopted. In addition, the road surface may be illuminated using side emission type LED tapes as the LED tapes 52 to 57, and a front emission type LED tape may be used as the LED tape 51.

In the above-described embodiment, the plurality of LED tapes 51 to 57 is connected in series. However, wiring may be performed such that some or all of the LED tapes are connected in parallel. In this way, a wiring method of the LED tapes 51 to 57 can be appropriately changed according to circumstances.

In the above-described embodiment, the LED tape has been described as an example of the LED light fixture. However, it is possible to use an elongated LED light fixture having another configuration such as an LED tube.

In the above-described embodiment, an irradiation range is widened by arranging a plurality of LED elements as point light sources. However, it is possible to use a light guide plate.

In the above-described embodiment, the go-kart 1 using the engine 41 as a driving source has been described as an example. However, the invention is applicable to a go-kart using an electric motor as a driving source.

EXPLANATION OF REFERENCE NUMERALS

1 GO-KART
10 VEHICLE BODY FRAME
21 FRONT WHEEL (WHEEL)
22 REAR WHEEL (WHEEL)
32 FRONT BUMPER (BUMPER)
51 LED TAPE (FRONT-SIDE LED LIGHT FIXTURE)
52 to 55 LED TAPE (LED LIGHT FIXTURE)
58 LIGHT SOURCE

The invention claimed is:

1. A go-kart comprising:
a vehicle body frame that supports a driving source and wheels and is exposed to an exterior,
wherein the go-kart includes an elongated light-emitting diode (LED) light fixture affixed to both left and right sides of the vehicle body frame extending in a front-rear direction to shine light below the vehicle body frame,
at least one of the wheels is supported on an outer side of the vehicle body frame in a left-right direction, and
at least one end of the LED light fixture extends in a front-rear direction into an area where the vehicle body frame extends into an area beside the at least one of the wheels, thereby illuminating, with light, inner side surfaces of the at least one of the wheels in the left-right direction.

2. The go-kart according to claim 1, further comprising:
a seat that is affixed to a center of the vehicle body frame and on which an occupant can be seated;
a mount frame having a quadrangular pyramid shape inclined backward, the mount frame being disposed behind the seat in the vehicle body frame and in front of an outside of a portion of the driving source; and
an LED tape affixed to the mount frame and extending in a vertical direction,
wherein the LED tape illuminates diagonally rearward while illuminating the portion of the driving source.

3. The go-kart according to claim 1, further comprising:
a bumper affixed to a front portion of the vehicle body frame and provided in front of the vehicle body frame;
a curved device positioned between the vehicle body frame and the bumper in a front-rear direction and extending in a left-right direction; and
a front-side LED light fixture that is affixed to a lower surface of the curved device and extends in the left-right direction,
wherein the front-side LED light fixture is configured such that a light source thereof faces forward.

4. The go-kart according to claim 2, further comprising:
a bumper affixed to a front portion of the vehicle body frame and provided in front of the vehicle body frame;
a curved device positioned between the vehicle body frame and the bumper in a front-rear direction and extending in a left-right direction; and
a front-side LED light fixture that is affixed to a lower surface of the curved device and extends in the left-right direction, wherein the front-side LED light fixture is configured such that a light source thereof faces forward.

* * * * *